Figure 1:
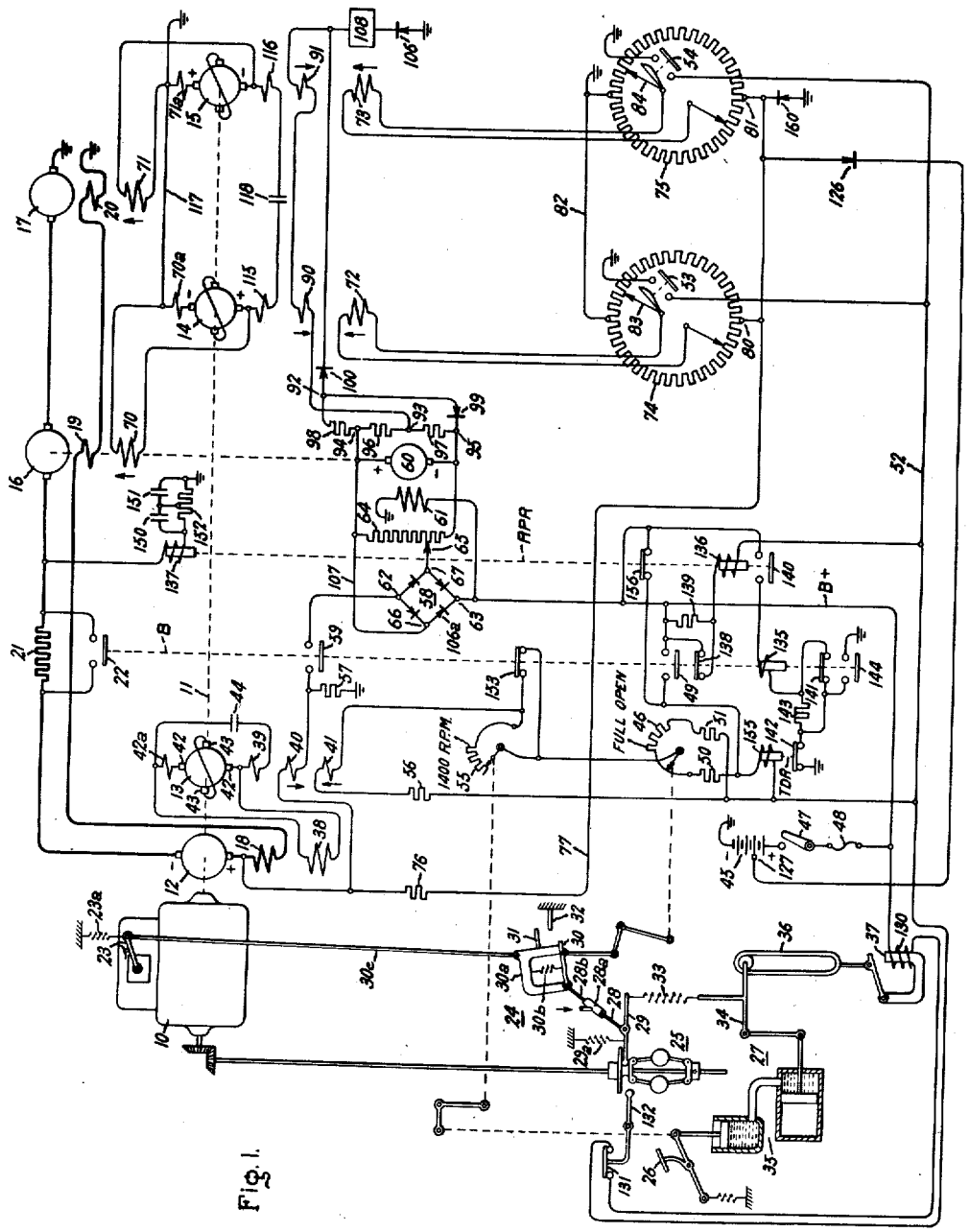

Inventor:
Martin A. Edwards,
by Harry E. Dunham
His Attorney.

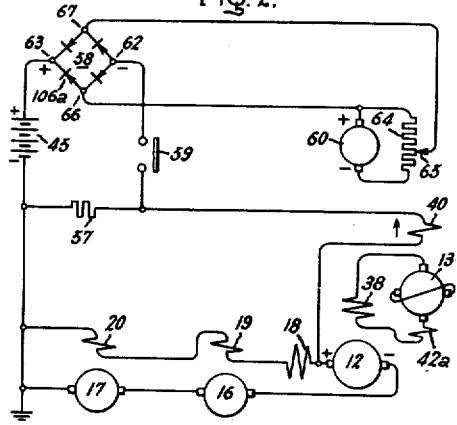
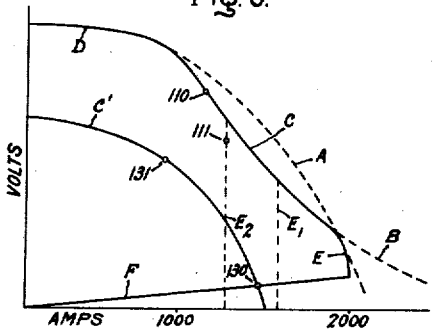
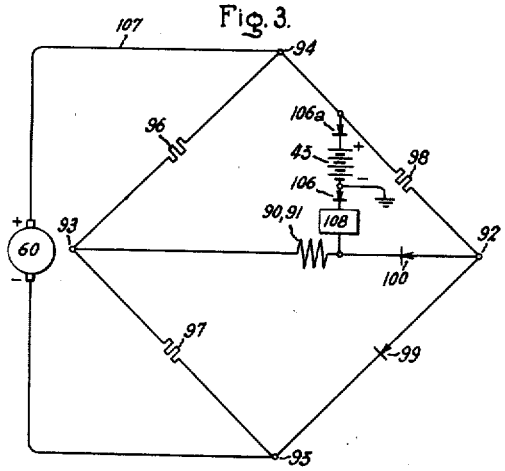
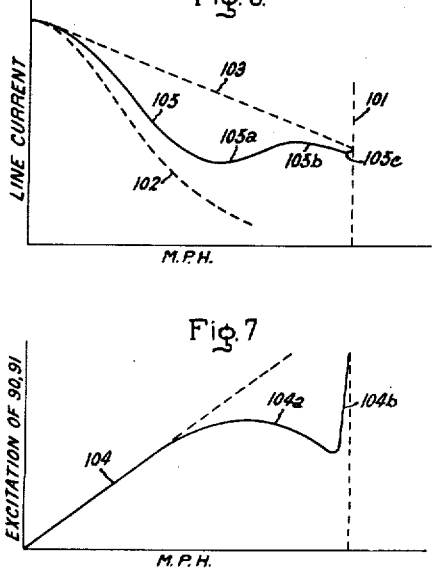
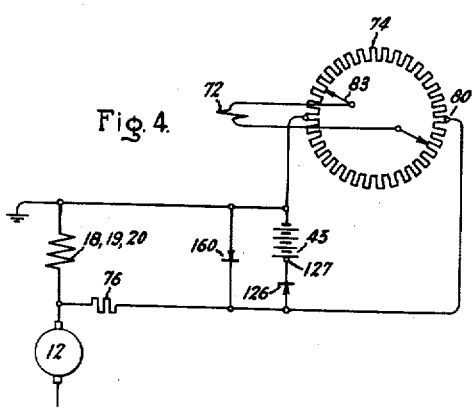

Patented Jan. 29, 1946

2,393,619

UNITED STATES PATENT OFFICE 2,393,619

POWER SYSTEM

Martin A. Edwards, Scotia, N. Y., assignor to General Electric Company, a corporation of New York Original application December 19, 1942, Serial No. 469,538. Divided and this application October 8, 1943, Serial No. 505,437

7 Claims. (Cl. 290—17)

My invention relates to power systems, and more particularly to speed responsive governing apparatus for gas- or Diesel-electric power systems, especially of the type commonly used in self-propelled vehicles.

My invention described and claimed herein was previously described and claimed in a copending application, Serial No. 469,538, filed on December 19, 1942, as a joint application of Donald E. Garr, John C. Aydelott, George M. Adams, and me and assigned to the same assignee as the instant application. This application is a division of the said joint application, Serial No. 469,538. Certain features of the power system described but not claimed herein are claimed in said joint application, which application is being amended as a joint application of Martin A. Edwards, Donald E. Garr and John C. Aydelott.

Diesel-electric power systems for self-propelled vehicles ordinarily comprise a prime mover, such as a Diesel or other internal combustion engine, arranged to drive a generator from which power is supplied to one or more traction motors. The systems of this type, which are in more or less common use at the present time, make use of traction motors of the series field type and utilize voltage control of the generator for controlling the torque and speed of the motors and reversing switches for controlling their direction of rotation. While such a system is suitable for application to vehicles in which all motors simultaneously undergo like changes of speed and torque, such as in Diesel-electric locomotives, busses, and the like, they are not sufficiently flexible to supply the demands of certain other types of vehicles in which an optimum of maneuverability is desired. This is especially true of such vehicles as tractors, electric shovels, military tanks, and the like which rely upon the independent control of laterally spaced driving elements for propulsion, steering, and braking. Essentially the same problems of propulsion, steering, and braking are encountered in twin screw or paddle wheel boats, although these applications are simplified to some extent insofar as extreme rapidity of the response, while it may be provided, is ordinarily not necessary.

For applications of the above nature, controlled current systems have been proposed. By such a system, I mean one in which the main generator is connected in a series or loop circuit with the motor armatures and arranged to supply to the armatures a constant or otherwise continuously controlled unidirectional current, while the excitation of the motor field windings is separately and independently controlled to determine the speed, torque, and direction of rotation of each of the motors. Such a system is shown in broad outline in British Patent 226,960 and satisfactorily meets the demands of maneuverability outlined above. For example, it will be evident that both motors may be suddenly reversed to effect dynamic braking merely by reversing the relatively small energizing currents of their field windings while the unidirectional armature current is maintained constant or within predetermined limits. Similarly, the torque of any one motor alone may be reduced or, in fact, reversed to effect steering operation.

While controlled current systems of the type shown in the British patent above referred to are suitable and satisfactory for marine applications, they have not heretofore been applied to land vehicles or to industrial applications, in spite of their obvious advantages in respect to maneuverability. The reason is evident when it is appreciated that, while the system of the British patent meets the principal demands of maneuverability, it is not characterized by rapid speed of response since such response is not ordinarily necessary in ship propulsion apparatus. A land vehicle on the other hand, especially one which is to be operated in close proximity to a number of other vehicles and over irregular terrain, must possess not only maneuverability, but also an extremely rapid rate of response.

My present invention relates to governing apparatus for gas-electric power systems particularly arranged to enhance the speed of response of the system and to minimize overshooting or hunting. For convenience of illustration, I am describing my governing system as applied to a controlled current power system for a self-propelled vehicle of the type described in aforesaid joint application of Edwards, Garr, Aydelott, and Adams. This particular electric vehicle propulsion system is being illustrated as one suitable application of my invention because this system incorporates also a number of other features which increase the speed of response of certain other parts of the system. These other features relate principally to motor and generator field excitation and, when combined with my new and improved governing apparatus, provide a unitary system particularly characterized by maneuverability, flexibility, and a remarkably rapid rate of response. I wish to have it understood, however, that my invention is not limited in its application to controlled current motor control systems, nor in fact to electric vehicle propulsion systems, but is applicable in general to electric power systems comprising a prime mover and a generator driven thereby to supply power to electric motors.

Accordingly, it is a general object of my invention to provide an improved gas-electric power system which is simple, reliable, easy to operate, and characterized by a rapid rate of response.

It is a further object of my invention to provide a governing apparatus for a gas-electric power system which is characterized by a rapid rate of response and provided with improved damping means to prevent objectionable overshooting or hunting.

It is a still further object of my invention to provide a new and improved governing apparatus for an engine-driven generator arranged to control both the engine and the generator to permit maximum utilization of available engine power over a wide range of generator load currents.

It is a still further object of my invention to provide a gas- or Diesel-electric power system for self-propelled vehicles arranged to permit maximum utilization of available engine horsepower over a wide range of vehicle speeds, while permitting rapid and continuous transition from motoring to electric braking operation at any speed without overloading any part of the system.

According to the illustrated embodiment of my invention, the above and other objects are attained by providing a gas- or Diesel-electric power system comprising a prime mover, a generator, and one or more traction motors, in which a unidirectional current of continuously controlled and definitely limited magnitude is circulated through the motor armatures and means are provided for separately controlling the excitation of the motor field windings independently to determine the speed, torque, and direction of rotation of the motors. By proper selection of forward and reverse torques for the separate motors, steering and forward or reverse motoring or electric braking operation may be effected without affecting the direct control of the continuously circulating armature current.

I provide an engine driven generator having an output circuit including the armatures of all the traction motors connected in series circuit relation. According to my invention, efficient utilization is made of the maximum available engine horsepower over a wide range of vehicle speeds by limiting the voltage-current characteristic of the generator to the maximum available engine horsepower in the region between the maximum generator voltage, as determined by saturation, and maximum generating current, as determined by armature reaction, or by a suitable current limit circuit. Each traction motor is also provided with a separate engine-driven exciter provided with a manually controlled excitation means to permit a smooth or continuous transition of motor excitation from maximum forward excitation to maximum reverse excitation. For any predetermined setting of the manually adjustable motor field control means, the motor exciter field and, hence, the motor field energization may be constant or may be connected to vary in accordance with the motor current, motor voltage, or motor speed, or any combination of these. In this system the line current is limited by an electric valve spill-over circuit for reducing the generator excitation upon occurrence of the predetermined current, the spill-over value being reduced as vehicle speed increases. Preferably, an electric valve spill-over circuit is also provided to reduce the power output of the motors whenever the vehicle attains a predetermined limiting speed.

For a more complete understanding of my invention and a further appreciation of its objects and advantages, reference should now be had to the following detailed specification taken in connection with the accompanying drawings in which Fig. 1 is a schematic circuit diagram of connections for an electric power system embodying my invention; Fig. 2 is a simplified circuit diagram of the current limit circuit; Fig. 3 is a simplified circuit diagram of the vehicle speed limit circuit, Fig. 4 is a simplified schematic circuit diagram of the main motor field energizing circuit; and Figs 5, 6 and 7 are graphical representations of various operating characteristics of the system.

Referring now to the drawings, and particularly to Fig. 1, I have illustrated schematically therein a Diesel or other gas-electric power system for a self-propelled vehicle. The system comprises a prime mover 10 of the internal combustion engine type, such as a Diesel engine, arranged to drive through a common shaft 11, a main generator 12, a generator exciter 13, and a plurality of traction motor exciters 14 and 15. An output circuit from the armature of the generator 12 is completed through the armatures of a pair of electric traction motors 16 and 17. The output circuit of the generator 12 is a series or loop circuit and includes a commutating pole winding 18 for the generator 12 and commutating pole windings 19 and 20 for the motors 16 and 17, respectively. The generator output circuit may be permanently closed as shown or, if desired, suitable disconnecting switches may be included. I have also shown, permanently connected to the output circuit, a braking resistor 21 arranged to be shunted during motoring operation by the contact 22 of a braking contactor B. It will be understood, of course, that the representation of the pair of traction motors 16 and 17 is purely diagrammatic and that each motor shown on the drawings may represent either a single motor or a group of motors arranged either in parallel or in series circuit relation. For purposes of illustration, it may be assumed that each motor or motor group 16, 17 is arranged to drive the track on one side of a track-laying vehicle, such as a tractor, military tank, or the like. For example, the motor 16 may drive the left-hand track, while the motor 17 drives the right-hand track.

It is well understood that an internal combustion engine of the type described, when its speed is maintained substantially constant by a governor, is capable of delivering at its output substantially constant maximum horsepower with the throttle fully open. As shown on the drawings, an engine throttle lever 23 is controlled through a hydraulic throttle linkage 24 from a governor 25 to maintain constant the speed of the engine 10, the setting of the governor being manually controllable by means of a foot pedal 26 through a speed setting linkage 27 to select a desired constant speed. By way of example, I have shown a flyball governor 25 arranged to rotate a governor shaft 28 through a lever 29. The governor is biased to a normal collapsed position by a tension spring 29a. Through a hydraulic connection 28a the shaft 28 is releasably connected to an aligned shaft 28b. The connection 28a is coupled hydraulically to the engine lubricating oil system (not shown) and is arranged to connect the shafts 28 and 28b in substantially fixed predetermined relation when oil pressure exists. When the oil pressure is zero, as when the engine is at standstill, the connection between the shafts 28 and 28b is effectively broken in the connector 28a. The shaft 28b has attached thereto an arm 30. Rotatably mounted upon the shaft 28b is a U-shaped yoke 30a. The outer leg of the yoke 30a is normally biased into engagement with the arm 30 by a tension spring 30b connected therebetween. The yoke 30a is connected by a rod 30c to the throttle lever 23. The throttle lever 23, rod 30c, yoke 30a, arm 30 and shaft 28b, are all normally biased to the idling position of the lever 23 by a throttle spring 23a. This entire mechanism is so arranged that, upon a decrease in engine speed, the inward movement of the flyballs will rotate the shafts 28 and 28b in a clockwise direction, as shown on the drawings, thereby to open the throttle and bring the engine speed substantially back to normal. The yoke 30a is also provided with a projection 31 arranged to engage fixed stop 32 in the full open position of the throttle thereby to prevent further movement of the throttle 23, but to permit overtravel of the lever 30 and a connected linkage for a purpose to be more fully described hereinafter.

The speed setting of the governor is controlled by a tension spring 33 connected between the lever 29 and a bell crank lever 34 in aiding relation with the spring 29a. The bell crank lever 34 is connected through a suitable linkage, such as a hydraulic system 35, to the foot pedal 26 and is so arranged that depression of the foot pedal applies tension to the spring 33. I have also shown, connected to the speed setting bell crank lever 34 through a lost motion linkage 36, a throttle solenoid 37. As will be explained more fully hereinafter, the throttle solenoid 37 is arranged to apply to the speed setting spring 33 an initial tension as soon as excitation is applied to the field winding of the generator 12 thereby to raise the engine speed to a certain predetermined minimum running speed above idling speed. The lost motion of the link 36 permits further application of tension to the speed setting spring 33 through the foot pedal 26.

*Generator field excitation*

The main engine driven generator 12 is provided with a main field exciting winding 38 connected directly to the terminals of the dynamoelectric exciter 13 and so controlled as to provide in the output circuit of the generator 12 a continuing unidirectional flow of current having a predetermined maximum or limiting value regardless of the back electromotive force of the traction motors 16 and 17. The voltampere characteristic of the generator 12 at any predetermined engine speed is dependent upon the energization of the main generator field exciting winding 38 which is, in turn, controlled by the energization of a plurality of control field windings 39, 40 and 41 on the exciter 13.

Preferably, the exciter 13 is a direct current generator of the type described and claimed in Patent 2,227,992, issued to Ernst F. W. Alexanderson and Martin A. Edwards on January 7, 1941. Such a generator is of the armature reaction excited type and is provided with a pair of current supply brushes 42, a series load compensating winding 42a, and a pair of short-circuited brushes 43. The control field windings 39, 40 and 41 are arranged to generate a voltage between the short-circuited brushes 43, and the armature reaction of the current flowing through the short-circuited connection as a result of this voltage sets up a flux in such a direction as to provide an output voltage at the load brushes 42 which is proportional to the excitation of the machine along its short-circuited axis. One of the desirable characteristics of an armature reaction excited generator of this type is that its output voltage responds very rapidly and with a high degree of amplification to any change in the energization of its control field winding. For this reason, machines of this type are frequently referred to as dynamoelectric amplifiers.

Referring now more particularly to the control field windings of the generator exciter 13, the winding 39 is a stabilizing or antihunt winding connected directly across the load terminals of the exciter in series with a capacitor 44. The field winding 39 is thus excited only upon a change in exciter voltage and in a direction to oppose the change. In main control of the generator exciter voltage is obtained through the generator exciter forward field 41 and the differential field 40. Fundamentally, the forward control field 41 is excited from a substantially constant voltage source of control power, such as a battery 45, while the differential field winding 40 opposes the winding 41 and is connected in shunt to the commutating pole windings 18, 19, and 20 in the generator output circuit for response in accordance with the main line current. The excitation of the differential field winding 40 is modified by certain auxiliary circuits which will be considered in greater detail hereinafter. Specifically, the forward control field winding 41 is energized across a governor controlled potentiometer 46 which is connected across the terminals of the battery 45 through a circuit which may be followed from the positive terminal of the battery through a disconnecting switch 47, a suitable protective fuse 48, a wire B+, a normally open interlocked contact 49 on the braking contactor B, a resistor 50, the potentiometer 46, a resistor 51 and a ground wire 52 which, in operation, is connected to the negative terminal of the battery 45 through ground and one or the other of a pair of manually operable "dead man" interlock contacts 53, 54 which will be more fully described hereinafter. The control field winding 41 itself is connected across the potentiometer 46 through a pedal control rheostat 55 and a fixed resistor 56.

In the drawings the various parts of the governor controlled mechanism are shown in their normal biased positions with the engine at standstill. Under such conditions the flyball mechanism 25 is completely collapsed by the springs 29a and 33.

Since no lubricating oil pressure exists, the hydraulic connection 28a is broken, so that the throttle spring 23a holds the throttle 23 and the throttle linkage 24 in the idling position. The overtravel spring 30b holds the arm 30 and connected linkage in its position of zero overtravel as shown in the drawings. When the engine is set into operation oil pressure is established in the connection 28a, thereby connecting the spring 23a to oppose the spring 29a. The flyballs assume their idling position because of the throttle position. At this time the spring 33 exerts no appreciable force and the opposing springs 29a and 23a are set to maintain the idling speed, for example about 650 R. P. M. As soon as one "dead man" interlock 53 or 54 is closed, the throttle solenoid 37 is picked up and sets the spring 33 to exert a predetermined initial tension in aiding relation to the spring 29a, thereby to increase the engine speed to a minimum running speed of, for example, 1200 R. P. M. The engine speed may now be further increased by depressing the pedal 26 to further increase the tension of the spring 33.

It will now be observed that the potentiometer 46 is arranged to effect no change in the voltage applied to the control field winding 41 during movement of the throttle from its idling position to its full open position. If, however, when the throttle is in its full open position the engine is still unable to maintain the desired speed, the governor 25 through the overtravel linkage connected to the arm 30 on the governor shaft 28b will continue to move the arm 30 and the slider of the potentiometer 46, even though no further movement of the link 30a and the throttle lever 23 is possible because of the stop 32. Such overtravel of the governor will, through the potentiometer 46, reduce the voltage applied to the generator exciter forward field winding 41 thereby to reduce the excitation of the generator exciter 13 and the main generator 12 and to permit the engine to again come up to the desired speed. By this arrangement, the power demand of the engine-driven generator 12 is reduced to the middle range of its volt-ampere characteristic where it normally exceeds the maximum available horsepower output of the engine 10, thereby to prevent slight engine stalling within this range and to permit maximum utilization of all available engine horsepower over a wide range of vehicle speeds and generator load currents.

In governor overtravel operation, where the engine speed is controlled by change of the generator excitation in accordance with governor position, it has been found that objectionable instability and hunting are encountered unless means are provided for rendering the generator excitation rapidly responsive to control by the governor and to prevent overshooting of the control point or "hunting." According to my invention, the governor overtravel field control system is rendered exceptionally stable by reason of the fact that the generator excitation is provided by the armature reaction exciter 13 which incorporates the antihunt field exciting winding 39. As previously explained, the response of the armature reaction excited generator 13 is extremely rapid, and large changes in its output may be produced by the control of very small amounts of input power. Accordingly, the governor overtravel linkage need control only very small control currents to produce large and rapid changes in the power output of the exciter. Furthermore, the exciter operation is rendered stable, even under such rapid changes of output, by provision of the stabilizing field exciting winding 39, which is energized only upon a change of exciter voltage and in such a direction as to tend to oppose any such change.

The purpose of the pedal rheostat 55 is to select a suitable generator excitation in accordance with the selected engine speed to permit easy starting of the vehicle and easy maneuvering at low speed. The rheostat 55 is arranged to reduce the generator exciter field resistance over an initial portion of the speed range, but to effect no change in the field resistance over the major portion of the accelerator pedal travel. As the slider of the resistor 55 is moved from its extreme counterclockwise position by accelerating movement of the pedal 26, the rheostat 55 is gradually excluded from the circuit and the exciter excitation is built up as the engine speed increases. Preferably, the rheostat 55 is arranged to be completely cut out at a relatively low engine speed. For example, if as supposed, the engine is arranged to have a minimum running speed of 1200 R. P. M. with the throttle solenoid 37 picked up, it has been found suitable to completely cut out the resistor 55 at a selected low engine speed setting of approximately 1400 R. P. M. as has been indicated upon the drawings. Thus, it will be observed that for pedal positions beyond that corresponding to this selected low speed, but less than full open, neither the governor potentiometer 46 nor the rheostat 55 exerts any control of the energization of the control field winding 41, so that the energization of the winding 41 is substantially constant within this range of throttle positions. It will be understood that variation of the field resistance 55 is not fundamental, but that, if desired, a fixed resistor may be substituted therefor. Beyond the full open position of the throttle, the governor 25 functions to reduce the power demand of the generator to equal the maximum available power output of the engine by control of the generator forward field 41 through the potentiometer 46.

As previously mentioned, the control field winding 40 is a differential winding and is arranged when energized to excite the generator exciter field in opposition to the flux of the winding 41. The field winding 40 is connected across the commutating pole windings 18, 19, and 20 in the generator output circuit and is thus energized in accordance with main line current, thereby to cause the output voltage of the generator 12 to drop from a predetermined maximum value to a value just sufficient to supply the resistance drop of the output circuit when maximum current is flowing. The normal energization circuit of the winding 40 may be followed from the positive terminal of the generator 12 through the winding 40 and a current limiting resistor 57 to ground.

*Line current limit*

For the purpose of limiting the current in the generator output circuit to a predetermined maximum value, supplementary means are provided for abruptly increasing the energization of the exciter differential winding 40 when the line current attains a predetermined maximum value. The current limit circuit may be more readily understood from the simplified diagram of Fig. 2. At Fig. 2, the connection of the exciter differential winding 40 across the commutating pole windings 18, 19, and 20 in series with a resistor 57 is clearly shown. To provide the maximum current limit, the resistor 57 is shunted by a circuit including the battery 45, a rectifier bridge 58, and a normally open interlock contact 59 of the braking contactor B. As pointed out heretofore, the braking contactor B is picked up during motoring operation so that the shunt circuit around the resistor 57 will be closed. It will be observed that both arms of the rectifier bridge are connected to block any flow of current from the battery 45 through the resistor 57. Furthermore, the generator polarity is such that when current is flowing through the output circuit in the normal direction, the side of the resistor 57 connected to the negative side of the battery is negative, and the side of the resistor connected through the rectifier bridge to the positive side of the battery is positive, so that the voltage drop across the resistor 57 opposes the voltage of the battery through the blocking rectifier bridge 58, the rectifiers preventing any flow of current through the loop circuit from the battery. It will now be evident that when the current flowing in the output circuit of the generator 12, and hence the current flowing through the exciter differential winding 40 and the resistor 57, attains such a value that the voltage drop across the resistor is greater than the voltage of the battery 45 by an amount sufficient to break down the rectifiers in the arms of the bridge 58, current will spill over from the positive terminal of the resistor 57 through the battery 45 thereby to provide a current path parallel to the resistor 57 and in series with the differential control field 40. By thus introducing a very low resistance shunt connection around the resistor 57, the net resistance of the circuit through the control field winding 40 is reduced and the energization of the control field winding 40 is sharply increased, thereby to diminish the excitation of the generator exciter 13 and to cut down the excitation of the main generator 12. The main line current at which the above spillover operation takes place is the maximum current limit for the generator output circuit. The added energization thus supplied to the control field winding 40 is sufficiently great so that no further increase in the main line current is possible after operation of the current limit circuit.

Viewed in another way, the current limit breakdown of the rectifier bridge 58 ties the negative terminal of the control field winding 40 to the positive terminal of the battery 45 through a circuit of very low resistance. In this way the potential of the negative terminal of the winding 40 is limited to battery potential and the potential of the positive terminal of the generator 12 is limited to battery potential plus the slight voltage drop through the winding 40. Any tendency of the potential of the negative terminal of the generator 12 to increase positively above this fixed potential, as by increased current through the resistor 57, causes such a large flow of current through the differential winding 40 and the battery spillover circuit that the generator excitation is immediately reduced to maintain the limited maximum current.

It is desirable to reduce the maximum current limit as the vehicle speed increases, that is, the current limit circuit should be brought into operation at a somewhat lower line current when the vehicle speed is high than when the vehicle speed is low. This condition is imposed by the limits of good commutation by the traction motors 16 and 17. It is well understood that the maximum current which may be satisfactorily commutated at high speed is less than that which may be satisfactorily commutated by the same machine at a lower speed. For this purpose, I provide a tachometer generator 60 having a separately excited field winding 61 energized directly from the battery 45 through the wire B+. The tachometer generator 60 is driven from the shaft of one of the traction motors, for example the traction motor 16, and thus provides an output voltage proportional to vehicle speed for modifying the operation of the current limit circuit. From the preceding discussion of the current limit circuit itself, it will be recalled that the shunt circuit across the resistor 57 is connected to diagonally opposite points of the rectifier bridge 58. These points have been identified as 62 and 63 at Figs. 1 and 2. Referring now particularly to Fig. 2, it will be observed that a potentiometer 64 having a variable voltage tap 65 is connected directly across the output terminals of the tachometer generator 60 to supply to the other pair of diagonally opposite points 66 and 67 of the rectifier bridge 58 a suitable voltage proportional to vehicle speed. Due to the rectifying action of the bridge 58, this speed voltage may be regarded as appearing permanently between the points 63 and 62 of the bridge regardless of the direction of motion of the vehicle, the point 63 being positive with respect to the point 62. From Fig. 2 it may also be observed that in the loop circuit comprising the battery 45, the rectifier bridge 58, and the resistor 57, the voltage drop across the resistor 57 and the speed voltage across the points 62 and 63 of the rectifier bridge 58 are connected additively and in opposing relation to the voltage of the battery 45. Thus, for current limit operation, the total voltage available for bucking the battery voltage to effect a spill over of current through the rectifier bridge and the battery from the positive terminal of the resistor 57 is increased in proportion to the speed of the vehicle by the voltage between the points 62 and 63 of the rectifier bridge. Since the battery voltage is substantially constant, it will be clear that as the vehicle speed increases spill over through the battery and, hence, current limit operation will take place with progressively smaller voltage drops across the resistor 57, that is, at reduced main line current, since the voltage drop across the resistor 57 is proportional to the main line current. In this way the maximum current limit is reduced as the vehicle speed increases.

*Traction motor field control*

Referring now to the field control for the traction motors 16 and 17, it may first be noted that each motor is provided with a main separately excited field winding, the motor 16 having a winding 70 connected to the output terminals of the dynamoelectric exciter 14 and the motor 17 having a field winding 71 connected to the output terminals of the dynamoelectric exciter 15. Preferably, the exciters 14 and 15 are machines of the armature reaction excited type heretofore described in connection with the generator exciter 13 and include series load compensating windings 70a and 71a, respectively. The exciters 14 and 15 are provided also with main control field windings 72 and 73, respectively, which are energized through manually controllable potentiometer bridges 74 and 75, respectively, in accordance with the voltage drop across the commutating pole windings 18, 19 and 20 of the main generator output circuit. The energizing circuit for the windings 72 and 73 may be traced from the positive terminal of the engine driven generator 12 through a resistor 76 and a wire 77 to the points 80 and 81 on the potentiometer bridges 74 and 75, respectively, and hence through both sides of both potentiometers in parallel circuit relation to a grounded wire 82. Thus, the voltage appearing across each potentiometer 74 and 75 from the points 80 and 81 to ground is proportional to the current of the generator output circuit as indicated by the voltage drop across the commutating pole windings 18, 19 and 20. A suitable voltage for application to the motor exciter field windings 72 and 73 is selected on the potentiometers 74 and 75 by means of manually positionable steering handles 83 and 84, respectively.

It is desirable at this point to note certain mechanical features of the steering handles 83 and 84. Primarily, these handles have for their purpose the determination of the standard of energization of the motor field windings 70 and 71 by selection from the potentiometers 74 and 75 of a suitable voltage proportional to line current for application to the motor exciter field windings 72 and 73. It will also be noted that the "dead man" interlock switches 53 and 54, previously mentioned, are actuated by handle levers attached to the steering handles and that these switches are arranged to be closed as soon as the handles are grasped by an operator. Preferably, as indicated in the drawings, the steering handles 83 and 84 are biased to a normal position such that substantially full forward voltage is applied to the control field windings 72 and 73. If desired, the steering handles may also be arranged to actuate a number of auxiliary switches and rheostats to effect refinements of the operation described and claimed in the aforementioned copending application Serial No. 469,538, and in a concurrently filed application, Serial No. 505,468, filed by George M. Adams and John C. Aydelott and assigned to the same assignee as the instant application. Since these features are no part of the present invention, however, they have been omitted to simplify the description.

It will be clear from the above description of the potentiometers 74 and 75 that, with the steering handles 83 and 84 set in any predetermined position, the energization of the main control field windings 72 and 73 of the motor exciters 14 and 15 will vary in accordance with the magnitude of the main line current. Furthermore, since the exciters 14 and 15 serve as dynamoelectric amplifiers, it will be clear that the energization of the motor field windings 70 and 71 is proportional to the armature current of the motors and that, except as modified under certain conditions explained hereinafter, the excitation characteristic of the traction motors 16 and 17 is similar to that of a series motor. It will be understood that the steering handles 83 and 84 are independently controllable, so that the standard of excitation of each motor may be selected independently and set at any desired point between full forward field and full reverse field. The energizing circuit for the motor exciter windings 72 and 73 is shown in simplified form at Fig. 4. While Fig. 4 shows only a single potentiometer bridge, it will be understood that the potentiometers 74 and 75 are connected in parallel circuit relation.

The series excitation characteristic of the traction motors 16 and 17 is desirable because it increases the speed up to which maximum utilization of available engine horsepower may be obtained. However, it has been found that even higher motor speeds than may be thus obtained are desirable at the point of maximum utilization of engine power. This demand arises in part from the fact that saturation of the motor fields at low vehicle speeds in an effort to obtain maximum tractive effort for starting impairs to some extent the proportionality between line current and the motor flux. Accordingly, in order further to increase the motor speed up to which maximum utilization of engine horsepower may be obtained, I provide additional means for exaggerating the series excitation characteristic of the motors by controlling the motor excitation in inverse proportion to vehicle speed, as well as in direct proportion to the main line current. For this purpose, I utilize the voltage of the tachometer generator 60 to energize in proportion to vehicle speed a pair of differential control field windings 90 and 91 on the motor exciters 14 and 15, respectively. Referring to Figs. 1 and 3, it will be observed that the control field windings 90 and 91 are connected in series circuit relation across intermediate points 92 and 93 of a bridge circuit, the line terminals 94 and 95 of which are connected to the terminals of the tachometer generator 60. Fig. 3 clearly shows the bridge circuit which comprises a pair of resistors 96 and 97 connected in series circuit relation between the terminals 94 and 95 and a resistor 98 connected in series with a rectifier 99, also between the terminals 94 and 95. The rectifier 99 is connected normally to conduct, the terminal 94 being positive. The arms of the bridge are so proportioned that the point 92 is normally positive with respect to the point 93 and the motor exciter field windings 90 and 91 are connected between these points. The energizing circuit for the windings 90 and 91 may be traced from the bridge terminal 92 through a rectifier 100 and the control field windings 90 and 91 in series to the terminal 93. Thus, as the vehicle speed and the tachometer voltage rise, the voltage across the bridge points 92, 93 increases proportionately. As indicated at Fig. 1, the differential control field windings 90 and 91 are energized in opposition to the main field windings 72 and 73, respectively, so that as the energization of the windings 90 and 91 increases with increasing vehicle speed, the net excitation of the traction motor exciters 14 and 15 and, hence, the excitation of the traction motors 16 and 17 themselves is reduced in proportion with the speed of the vehicle. It will be borne in mind that this effect is superposed upon the reduction of traction motor excitation due to the decrease in main line current as the vehicle speed increases and, hence, produces an exaggerated series motor characteristic.

The reason for making use of the rectifier 99 as one arm of the bridge circuit of Fig. 3 will become evident from an examination of the curves of Figs. 6 and 7. The rectifier 99 serves as a non-linear resistor which decreases its resistance as the voltage across the bridge increases. Referring first to Fig. 6, I have here shown the relation between the vehicle speed and line current from zero speed up to maximum vehicle speed. The maximum vehicle speed is indicated at Fig. 6 by a line 101. The maximum vehicle speed is indicated at Fig. 6 by a line 101. The manner in which the vehicle speed is limited to this maximum will be described hereinafter, but for the present it is sufficient to note that the broken line curve 102 of Fig. 6 indicates the manner in which the line current would diminish as the vehicle speed increases were it not for the additional field weakening due to the energization of the motor exciter field windings 90 and 91. Also, at Fig. 6, the straight line 103 indicates the maximum current limit which, as has been heretofore explained, diminishes as the vehicle speed increases. As described in the preceding paragraph, the excitation of the control field windings 90 and 91 increases with vehicle speed and this increase is substantially linear over a portion 104 of the curve of Fig. 7 so that the line current of Fig. 6 follows a curve 105 rather than the curve 102. As indicated at Fig. 6, the departure of the curve 105 from the curve 102 becomes more pronounced as the energization of the field windings 90 and 91, as shown in Fig. 7, increases. Thus, due to the effect of the field windings 90 and 91, the line current begins to show an increase at a portion 105a of the curve 105 and begins to approach the current limit value. Since it is undesirable that the current limit be exceeded at this point, further increase in the energization of the field windings 90 and 91 is prevented and, in fact, a net decrease in their energization may be produced by the action of the rectifier 99. The negative resistance voltage characteristic of the rectifier 99 becomes pronounced at relatively high tachometer voltages thereby to reduce the resistance of the bridge arm in which it lies and to preclude further increase in the voltage of bridge terminal 92 with respect to terminal 93. Indeed, the effect of the rectifier 99 may be made so pronounced as to actually reduce the voltage across the control field windings 90 and 91 despite further increases of tachometer voltage (see the portion 104a of the curve 104, Fig. 7). As indicated at Fig. 6, then, this has the effect of again reducing the line current at a portion 105b of the curve 105. By thus limiting and, in fact, reducing the energization of the windings 90 and 91 in the high speed range, an increase of the line current to the limiting value is avoided. The non-linear bridge circuit motor field control systems described above are claimed in an application of George M. Adams, Serial No. 505,469, filed concurrently herewith and assigned to the same assignee as the instant application.

*Vehicle speed limit*

In addition to their function of exaggerating the series excitation characteristic of the traction motors, the motor exciter control field windings 90 and 91 are connected in circuit with the control battery 45 to provide a vehicle speed limit control and indication. For this purpose, the voltage of the tachometer generator 60 is matched against the voltage of the battery 45 through a loop or spill-over circuit including the control field windings 90 and 91 of the motor exciters 14 and 15 and a pair of blocking rectifiers 106 and 106a (see Figs. 1 and 3), the rectifier 106a being in the rectifier bridge 58. The blocking rectifiers normally prevent a flow of current from the battery through the tachometer generator 60 and the field windings 90 and 91, but permit a spill-over current from the tachometer generator through the battery and the control field windings 90 and 91 to supply supplementary excitation to the field windings whenever the vehicle speed is such that the tachometer voltage, or a suitable portion thereof, exceeds the battery voltage. The spill-over connection may be traced at Figs. 1 and 3 from the positive terminal of the tachometer generator 60 through a wire 107, the rectifier 106a, the wire B+, and the battery 45 to ground, and from ground through the rectifier 106, a suitable visual or audible speed indicating device 108, the motor exciter control field windings 90 and 91, and the resistor 97 to the negative terminal of the tachometer generator 60. It will now be clear that the rectifier 100 is included in the normal or bridge excitation circuit of the control field windings 90 and 91 for the purpose of preventing short-circuiting of these field windings through the rectifier 99 upon spill-over in speed limit operation. From the above circuit it will be evident that the rectifiers 106 and 106a are so arranged that current cannot flow from the battery 45 through the tachometer generator 60. On the other hand, when the vehicle attains such a speed that the voltage at the output terminals of the tachometer generator attains a value greater than that of the battery voltage, the two blocking rectifiers will permit current to spill over from the tachometer generator through the battery, the overspeed indicating device 108, and the motor exciter control field windings 90 and 91. Furthermore, it is to be noted that the vehicle speed at which such spill over will occur is substantially unaffected by changes in the battery voltage because of the fact that the tachometer generator is battery excited, so that as the battery voltage increases or decreases, the tachometer generator voltage increases or decreases proportionately.

The operation of the speed limit circuit may now be followed. It will be recalled that, independently of any energization of the motor exciter control field windings 90 and 91 through the speed limit spill-over circuit traced in the preceding paragraph, these field windings are continuously excited through the bridge circuit of Fig. 3 in the manner indicated at Fig. 7. Referring now to Fig. 6, as the vehicle speed limit is approached, the line current is in the region 105b of the curve 105. If now, the vehicle speed becomes such that the tachometer voltage causes current to spill over through the speed limit circuit thereby to energize the overspeed indicating device 108 and to superpose additional energization upon the normal energization of the motor exciter field windings 90 and 91, the total energization of the windings 90 and 91 will increase sharply as indicated at the portion 104b of the curve of Fig. 7. Such increase in the energization of the differential windings 90 and 91 will cause a sharp decrease in the net motor exciter excitation and, hence, in the net motor excitation, so that the line current will increase sharply as indicated at 105b of Fig. 6. This sharp increase in the line current will bring the line current to the limiting value at the speed of operation as indicated by the curve 103 of Fig 6, so that the line current limit circuit previously described will be brought into operation. With the motor current thus limited at the the current limit value, the motor power is determined by the motor voltage. The motor voltage is proportional to the motor speed and to the excitation of the motor field windings, so that with the motor speed remaining at the maximum value and the motor excitation severely limited by the increased excitation of the motor exciter fields 90 and 91, the motor power will drop off thereby to reduce the vehicle speed. When the vehicle speed is thus reduced, the tachometer voltage is reduced below the spill-over value and supplementary excitation of the motor exciter fields 90 and 91 ceases. It will thus be clear that the system will regulate on this point to maintain the vehicle speed at its maximum value.

The above operation of the system under speed limit conditions will be clarified by a consideration of Fig. 5. This figure is a more or less conventional diagrammatic representation of the power characteristics of a Diesel-electric system. Thus, the main generator 12, if driven at any selected speed, will exhibit an inherent full load volt-ampere characteristic of the general shape of the curve A, while the maximum power output of the engine 10 will be substantially constant, as indicated by the curve B. Ordinarily, the capacities of the various elements of the system are so selected that these curves intersect in the central operating range in order to attain maximum utilization of the available engine power over the widest possible range of vehicle speed. From the curves A and B, it will be evident that within the central portion of the operating range the generator is demanding more power than the engine is capable of supplying and that the only way that the curves may be caused to coincide, as they must, is for the power output of the generator to be slightly diminished by slight engine stalling within this range. Since such reduction in the engine speed also cuts down the available power output from the engine, it is desirable, if possible, to cut down the generator demand so that it just equals the engine output. According to my invention, provision is made for reducing the generator excitation by means of the governor operated potentiometer 46, previously described. By way of example, the curves A and B have been drawn for the full open position of the engine throttle. With the throttle in this position, the potentiometer 46 has effected no change in the potential applied to the generator exciter field 41. However, as previously explained, the governor is provided with a certain degree of overtravel so that, if with the throttle in the full open position the engine speed still cannot be maintained, the lever 29 attached to the governor moves the slider of the potentiometer 46 to effect a reduction in the energization of the generator exciter field winding 41 without further opening of the engine throttle. By thus reducing the excitation of the main generator 12, the power demand of the generator is reduced to a point where it just equals the available power output of the engine. This action is of a regulatory nature and results in bringing the generator volt-ampere characteristic into coincidence with the available power output of the engine over the constant power range C of the resultant generator volt-ampere characteristic shown in solid lines at Fig. 5. It will be understood that in the region D, the voltage of the generator is limited to a predetermined maximum value by saturation of the generator field poles. The portion E on the curve of Fig. 5 is determined by operation of the current limit circuit at zero or low vehicle speed. It will be understood that as the vehicle speed increases, the current limit is reduced as indicated by the constant current lines E1 and E2 of Fig. 5. The portion F of the generator volt-ampere characteristic represents the pure resistance drop through the armatures of the traction motors along which the line current built up in proportion to generator voltage when the vehicle starts from standstill.

Referring again to the operation of the vehicle speed limit with the curve of Fig. 5 in mind, it will be evident that, if the vehicle is operating at a point 110 on the generator volt-ampere characteristic when the vehicle speed reaches its maximum value, the sharp increase in motor exciter differential field excitation produced by the speed limit circuit, and indicated at Fig. 7, and the consequent sharp increase in line current indicated at Fig. 6 will cause the operating point 110 of Fig. 5 to move down the curve C to the maximum speed current limit curve E2, and hence down the current limit curve E2 to a point such as 111 of Fig. 5. It will be clear that the system power represented at the point 111 is less than that represented by the constant power curve C, so that the power output of the motors will be reduced and the vehicle will slow down as previously described.

*Stabilization of motor excitation*

It will be understood from the above that when the vehicle is moving forward under power, the counter-electromotive force of the motors is almost equal and opposite to the output voltage of the engine driven generator 12. Since the motor voltage is proportional to the product of the motor flux and motor speed, it is apparent that when the vehicle is traveling at a relatively high speed the motor flux is quite weak, while the generator 12 is operating under partial saturation in its upper range of voltage. Under such conditions it will be evident that the motor exciters 14 and 15 are capable of forcing an extremely rapid change of motor field flux with only a relatively small change of motor field energization, while because of the generator field saturation a relatively large voltage change at the generator exciter 13 is necessary to produce a proportional change in the generator field flux. Accordingly, if the excitation of the traction motors is suddenly reduced or reversed to initiate dynamic braking operation, it will be clear that a transient current of considerable magnitude might flow in the generator output circuit because of the fact that the motor field flux will reverse much more quickly than the generator flux can be reduced by operation of the current limit circuit. For the purpose of bringing this undesirable condition within permissible limits, the motor exciters 14 and 15 are provided with stabilizing control field windings 115 and 116, respectively. Referring to the drawings, it will be observed that the positive terminal of the motor exciter 15 and the negative terminal of the motor exciter 14 are connected together and to ground through a wire 117, while the positive terminal of the motor exciter 14 is connected through the stabilizing control field winding 115, a condenser 118, and the stabilizing control field winding 116 to the negative terminal of the motor exciter 15. Thus, when the system is operating under steady state conditions, no current flows through the stabilizing windings 115 and 116, the condenser 118 merely being charged to a potential equal to the sum of the potentials across the output terminals of the motor exciters 14 and 15. The stabilizing circuit is a loop circuit comprising the armatures of the motor exciters 14 and 15, the control field windings 115 and 116, and the condenser 118, all in series circuit relation, the circuit being tied to ground between the armatures of the motor exciters by the wire 117.

It may now be observed that, if the voltages across the output terminals of both motor exciters are changing in the same sense, that is, if increased or decreased motoring or braking torque is simultaneously being called for on both exciters or if the excitation of both exciters is suddenly and simultaneously changed from forward excitation to reverse excitation, the condenser 118 is charged or discharged (depending upon the direction of the change) through the stabilizing control field windings 115 and 116. These stabilizing windings are so arranged that the components of field excitation which they produce under such conditions of change in the motor exciters 14 and 15 tend to oppose the change of voltage in each machine. In this manner the rate of change of output voltage of the motor exciters is sufficiently decreased so that the generator exciter differential field 40 is able to make the flux of the generator field 38 follow the motor flux sufficiently closely to prevent an exceedingly high transient current during a rapid change of motor excitation. If, on the other hand, the voltage of only one of the motor exciters is changed either by increasing or decreasing the field excitation of that motor, while the voltage of the other motor exciter is maintained constant, the condenser 118 will also undergo a change in charge. In this case, however, the current through the stabilizing field windings 115 and 116 will be in the same direction in both windings, so that the current through the stabilizing winding of that motor exciter whose voltage is undergoing change will tend to oppose the change, while the current through the stabilizing winding of that motor exciter whose field excitation is not otherwise undergoing change will tend to produce a change of voltage of that exciter in a direction opposite to the voltage change in the first exciter. This latter effect is desirable in connection with steering operation. Steering is effected by moving one steering handle to change the torque of the associated motor. In order that maximum steering efficiency may be attained, means may be provided for automatically changing the torque of the other motor in the opposite direction without necessitating movement of the other steering handle. Such means are described and claimed in the aforementioned copending application of Edwards, Garr, Aydelott, and Adams. It will be clear that the above transient effect aids such an automatic change in motor excitation.

The stabilizing arrangement described above is described and claimed in the aforementioned concurrently filed application of George M. Adams, Serial No. 505,469.

*Steering*

As briefly mentioned in the foregoing paragraph, steering of the vehicle is effected by actuating one or the other of the steering handles to reduce or reverse the torque of the associated motor without reducing the torque of the other motor, thereby to cause the vehicle to turn towards the side upon which the torque is reduced or reversed. Referring to Fig. 1, if the steering handles are in the full forward motoring position shown, steering may be effected by pulling one handle, for example, the right-hand steering handle 84 backwards toward or to the null position. If very abrupt steering is required, the handle may be pulled back into the reverse quadrant to effect reversal of the torque and braking operation of the right-hand motor. During such operation, the left-hand motor continues to exert a forward motoring torque. It will of course be understood that if the vehicle is traveling in the reverse direction, steering is effected by moving one handle toward or into the forward quadrant.

*Dynamic braking operation*

Dynamic braking operation without steering is effected by drawing both steering handles 83 and 84 simultaneously from their forward quadrants into their reverse quadrants. By this operation the field excitation of the traction motors 16 and 17 is reversed so that these motors act as generators, their voltages adding to the voltage of the main engine driven generator 12. Under these conditions, the series excitation characteristic of the traction motors becomes a series generator characteristic having a marked cumulative effect; that is, as the excitation of the traction motors is increased in a braking sense, the line current is increased, and as the line current increases, the excitation of the traction motors is further increased. This effect is aggravated by the tendency to transient overshooting of the line current limit previously explained as resulting from the inability of the generator to reduce its voltage as quickly as the motor voltage is reduced when making a sudden transfer to dynamic braking operation.

While the exciter stabilizer windings 15 and 16 limit the above current limit overshooting to permissible values, it is also desirable to limit the braking torque when such high line currents exist. Indeed, it has been found desirable to limit the braking torque at high line currents even though the line current does not exceed the current limit value. For this purpose, means are provided for limiting the excitation of the traction motors 16 and 17 to a predetermined maximum value so that the series excitation characteristic of the traction motors is transferred to a constant or shunt excitation characteristic upon the occurrence of a predetermined high line current. Fig. 4 shows the manner in which the energization of the main motor exciter control field windings 72 and 73 is limited to a definite maximum value. As has been previously pointed out, Fig. 4 shows the potentiometer bridge 74 (the potentiometer bridge 75 being connected in parallel circuit relation therewith) connected across the inter-pole windings 18, 19, and 20 in the generator output circuit in series with the resistor 76. Furthermore, it will now be understood that the basic series characteristic of the motor exciter winding 72 arises from the fact that the potential at the point 80 of the potentiometer 74 is proportional to the voltage drop across the commutating pole windings 18, 19, and 20 as derived through the resistor 76. In order to limit the potential at the point 80 to a predetermined maximum value, this point is tied through a blocking rectifier 126 to a point of intermediate voltage 127 on the battery 45. From Fig. 1, it will be evident that the point 127 has a fixed potential slightly above ground potential as determined by the battery 45. So long as the potential of the point 80 remains below that of the point 127 on the battery 45, current cannot flow from the battery through either the potentiometers or the commutating pole windings 18, 19, and 20 because of the presence of the blocking rectifier 126. However, should the line current through the commutating pole windings 18, 19, and 20 attain such a value that the potential at the point 80 tends to attain a value in excess of the potential at the point 127, current will spill over from the point 80 through the rectifier 126 and the connected portion of the battery 45 to ground thereby limiting the potential of the point 80 to a predetermined maximum potential. After this operation, the potential of the point 80 remains substantially fixed regardless of the value to which the line current, and hence the potential drop across the commutating pole windings 18, 19, and 20, may go. Therefore, when the line current attains a value sufficient to cause such spill over, the energization of the motor exciter control field windings 72 and 73 and, accordingly, the excitation of the traction motors 16 and 17, attains a fixed maximum value and is possessed of a shunt characteristic.

In this manner, the undesirable cumulative effects of motor field strength are minimized when going into dynamic braking operation. It should be noted that the excessive potential at the point 80 may not be due alone to a simple resistance drop across the commutating pole windings 18, 19, and 20. Upon a very rapid change in line current, as due to a quick reversal of the traction motor field windings, such an excessive potential may arise at least in part from the inductive drop across the commutating pole windings. The spill over circuit through the rectifier 126 guards also against such excessive inductive transient potentials.

Under conditions of rapidly changing line current in going suddenly into braking operation as described above, the inductive potential appearing across the interpole field windings 18, 19, and 20 is utilized to hasten the decrease in the excitation of the generator 12 to its steady state value. For this purpose, the energization of the differential field winding 40 of the generator exciter 13 is arranged to go to exceedingly high values. It will be recalled that the differential field winding 40 of the generator exciter 13 is energized across the commutating pole windings 18, 19, and 20, so that any inductive voltage drop appearing at the positive terminal of the generator 12 will provide a transient increase in energization of the winding 40 and, hence, a rapid decrease in the net excitation of the generator exciter 13 and the generator 12. By forcing an increased current through the differential field winding 40, the inductive voltage at the positive terminal of the generator 12 also appears across the resistor 57 in the generator exciter differential excitation circuit and tends to bring into operation the line current limit circuit previously described, so that the energization of the generator exciter differential control field 40 may be further increased by spill over of the current limit circuit through the rectifier bridge 58 and the battery 45 as previously described.

*Operation*

In view of the foregoing detailed explanation of the various parts of the system and their manner of connection and mode of operation, the operation of the system as a whole will readily be understood from the following brief description from the viewpoint of the operator.

Three simple and convenient controls are provided at the driver's position, namely, the accelerator pedal 26 for controlling the speed and power output of the internal combustion engine, and the left and right steering handles 83 and 84, respectively, for independently controlling the speed, torque, and direction of rotation of the left- and right-hand tracks. As previously described, the steering handles 83 and 84 are provided with "dead man" interlocks 53 and 54 normally biased to an open position.

Starting of the engine 10 has been described heretofore under the section on "Generator field excitation."

Motoring operation may now be initiated simply by grasping one or both of the steering handles to close one or both of the "dead man" interlocks 53, 54. The interlocks 53, 54 are connected in parallel circuit relation, and the closure of either interlock completes an energizing circuit for the main control field winding 41 of the generator exciter 13 through a circuit which has been previously traced. Simultaneously, an energizing circuit is completed from the positive terminal of the battery 45 through an actuating winding 130 of the throttle solenoid 37 to the wire 52 and through the "dead man" interlocks 53 and 54 to ground. This circuit also includes a normally closed interlock contact 131 on an overspeed device 132. The overspeed device 132 is arranged to be actuated upon overspeeding of the engine 10 to deenergize the throttle solenoid 37. As has been explained hereinbefore, the actuation of the throttle solenoid 37 adjusts the setting of the governor 25 to maintain a predetermined minimum running speed of the engine 10 thereby to assure adequate power for steering or braking even though the accelerating pedal 26 should be accidentally released.

Closure of one of the "dead man" interlocks 53, 54 to initiate motoring operation also completes an energizing circuit through a reverse power relay FPR for an actuating coil 135 of the braking contactor B. The braking contactor B is normally open, but is closed during motoring operation to shunt the braking resistor 21 in the main generator output circuit. The reverse power relay RPR for an actuating coil 135 of the braking 136 and a directional winding 137. Upon closure of one of the "dead man" interlocks 53, 54, an energizing circuit is completed for the polarizing winding 136 from the wire B+ through a normally closed interlock contact 138 on the braking contactor B and the winding 146 to t' 3 wire 52 and hence to ground. When so ener ized, the reverse power relay RPR picks up and is retained in its actuated position by a holding current of limited value through a resistor 139 which shunts the normally closed interlock contact 138. Upon actuation of the relay RPR an energizing circuit is completed for the actuating winding 135 of the braking contactor B through a circuit which may be traced from the wire B+ through a normally open interlock contact 140 on the reverse power relay RPR, the actuating winding 135 of the braking contactor B, a normally closed interlock contact 141 on the braking contactor B, and a normally closed interlock contact 142 on a time delay relay TDR to ground. Thus energized, the braking contactor B picks up to close the shunting contact 22 around the braking resistor 21 and to complete for its actuating coil 135 a holding circuit through a current limit resistor 143 and a self-actuated normally open interlock contact 144. After the contactor B picks up, it closes a circuit for an actuating coil 155 of the time delay relay TDR through the interlock contact 49 on the contactor B. Opening of the time delay relay contact 142 has no effect for the present because it is now shunted by the lock-in contact 144 on the contactor B.

By way of summary then, simple closure of one or the other of the "dead man" interlock contacts 53 or 54 immediately increase, the engine speed to a predetermined minimum, picks up the braking contactor B to shunt the braking resistor 21, and completes the field excitation circuit for the generator exciter 13. The consequent current flowing in the output circuit of the generator 12 produces a voltage drop across the commutating field windings 18, 19 and 20 and thus energizes the main control field windings 72 and 73 of the traction motor exciters 14 and 15 through the potentiometer bridges 74 and 75, respectively, so that a torque is supplied to the driving wheels. Since the steering handles 83 and 84 are in their positions of maximum forward torque, the vehicle will begin to accelerate from standstill in the forward direction. As the vehicle comes up to speed, the motor current falls off and the voltage rises from a point 130 on the IR line F of Fig. 5 and along a low engine speed power curve C' to some point, such as the point 131. It will be understood that, as the line current diminishes, the motor torque also diminishes so that the point 131 is determined as that point at which the total motor torque just overcomes the resistance to motion of the vehicle.

With the establishment of current in the generator output circuit, the directional winding 137 of the reverse power relay RPR is energized in proportion to the motor voltage and cumulatively with respect to the polarizing winding 136 of the reverse power relay. The winding 137 thus tends to hold the reverse power relay in its actuated position.

To increase the speed of the vehicle the accelerator pedals 26 must be depressed. The engine 10 is thereby speeded up and its power increased, thus increasing the generator output current and the motor torque. The vehicle will, therefore, speed up until the increased motor torque just balances the resistance of the terrain over which the vehicle is operating. When the pedal 26 is fully depressed operation will be along the curve C of Fig. 5, as at the point 110. It should be noted that the speed of the vehicle cannot be increased simply by moving the steering handles forward (assuming that they had previously been moved from the maximum forward position) to increase the motor excitation. This will be evident from the fact that no greater power is thereby supplied to the motor, since the generator power output is not changed by moving the steering handles. The only effect of moving the steering handles forward simultaneously is to increase the motor voltage and, thus, decrease the motor current so that the operating point moves along one of the constant horsepower curves, such as the curve C of Fig. 5, to a higher voltage point.

If during forward motoring operation the accelerator pedal is depressed sufficiently far to increase the vehicle speed to its predetermined maximum value, the speed limit circuit functions in the manner heretofore described to diminish the excitation of the traction motors and to give a visual or audible indication at the overspeed indicating device 108. The operation of the speed limit circuit and its relation to the current limit feature has been explained hereinbefore. So far as the operator is concerned, the functioning of the speed limit circuit and an indication on the overspeed device 108 should be taken as a signal for releasing the accelerator pedal to some extent thereby to reduce the power output of the engine and to permit the system operating point to move off of the current limit. This is desirable, as obviously it is more efficient to operate the system at low current and high voltage than to operate at low voltage and high current.

One outstanding feature of the motor control system described here by way of illustration is that in the event that the motor vehicle, while motoring forward, encounters a downhill grade and the operator makes no attempt to check the vehicle speed, the speed limit protection will operate not only to reduce the engine horsepower output in the manner previously explained, but will actually reverse the net excitation of the traction motor field windings thereby automatically to initiate dynamic braking operation and to maintain the vehicle at the maximum permissible speed. To illustrate, let it be assumed that the vehicle is brought to a steep downhill grade with the engine 10 running at its maximum speed and the steering levers 83 and 84 pushed forward to their maximum torque positions, as shown at Fig. 1. As the vehicle speed increases, the voltage of the tachometer generator 60 will become so great that the current spilled over from the tachometer generator through the battery 45 and the motor excited differential windings 90 and 91 will become sufficient to completely overpower the main control field windings 72 and 73 to reverse the net excitation of the motor exciters 14 and 15 at the motors 16 and 17 thereby to initiate dynamic braking operation.

The manner in which the vehicle may be steered by reducing or reversing the torque on one or the other of the motors has been previously described. Also, dynamic braking without steering by simultaneous transfer of the steering handles 83 and 84 to their reverse quadrants has been explained with reference to the motor field excitation circuits. It may now be noted that when such dynamic braking operation is initiated, the back electromotive force of the traction motors 16 and 17 is reduced to zero and then reversed. As the back electromotive force of the traction motors approaches zero, or begins to reverse in going into braking, the directional coil 137 of the reverse power relay RPR functions to drop out the reverse power relay thereby to deenergize the actuating coil 135 of the braking contactor B and to cause the contactor B to drop out and to unshunt the braking resistor 21. During dynamic braking operation, the power generated by the generator 12 and the traction motors 16 and 17 is absorbed in the braking resistor. Proper operation of the reverse power relay RPR is ensured by a pair of capacitors 150 and 151 connected across the resistor 152 in the circuit of the directional coil 137. These capacitors function to cause the reverse power relay to anticipate its normal setting sufficiently so that even when the rate of change of motor voltage is greatest the braking contactor B is opened at the desired time. As braking proceeds with the motor voltage reversed, the reverse power relay RPR remains dropped out and the braking contactor B likewise remains deenergized. As the motor voltage decreases with decreasing vehicle speed, the voltage of the main generator 12 increases to maintain the continuing unidirectional current in the main line circuit. Since the current in both the motor armatures and the motor field windings is maintained, dynamic braking may be made effective until the vehicle reaches standstill.

Opening of the braking contactor B indicating that dynamic braking is in progress also effects a number of protective functions necessitated by braking operation. In the first place, the interlock contact 59 of the contactor B disables the current limit circuit thereby to remove the current limit effect during dynamic braking. This will be evident from Fig. 2 and is necessitated by the fact that the voltage of the engine driven generator 12 cannot be permitted to reverse under the influence of the differential exciter field winding 40 in an attempt to maintain the line current at the current limit value. If the generator voltage were permitted to reverse, it would mean that the generator was acting as a motor to drive the internal combustion engine 10.

While slight overspeeding of the engine 10 is permissible, any substantial overspeeding must be avoided in order to prevent damage to the engine. A second normally closed interlock 153 is also included on the braking contactor B for the same reason. When the braking contactor B drops out, the interlock 153 shunts the rheostat 55 to ensure that maximum forward field is maintained on the generator exciter 13. Unless the generator exciter forward field 41 is kept at its maximum value during braking, it is possible that even the minimum strength of the generator differential field 41 would be sufficient to cause reversal of the main generator voltage and overspeeding of the engine 10.

It is also to be noted that during braking the interlock contact 138 on the contactor B is closed to shunt the holding resistor 139 in circuit with the reverse power relay polarizing coil 136 thereby to change the calibration of the reverse power relay and to restore its normal pick up circuit. The interlock contact 141 on the braking contactor B also closes during dynamic braking to short circuit the holding resistor 143 in series with the actuating coil 135 of the braking contactor and to restore the normal pick up calibration of the braking contactor.

During dynamic braking operation while the reverse power relay RPR remains dropped out, energization of the braking contactor coil 135 is precluded by the time delay relay TDR, the actuating winding 155 of which is maintained energized through a normally closed interlock contact 156 on the reverse power relay RPR which shunts the now open interlock contact 49 on the contactor B. When dynamic braking is completed and the vehicle speed is reduced to zero, the RPR relay recognizes this fact by the fact that the motor voltage is substantially zero. The reverse power relay then picks up and deenergizes the forward field winding 41 of the generator exciter 13 at the RPR interlock contact 156. Opening of the contact 156 also deenergizes the time delay relay TDR. The time delay relay, however, does not immediately drop out. Thus, for a short time, the generator exciter 13 is energized only by its differential field winding 40 and its voltage is rapidly brought to zero. After a suitable time, which is just enough to allow the line current to come approximately to zero, the time delay relay TDR drops out and closes its interlock contact 142. Closure of the contact 142 completes an energizing circuit for the braking contactor B and the contactor B picks up and locks itself in through its interlock contact 144. It will be understood, of course, that at this time the operator will release the "dead man" handle interlocks 53 and 54 and return the steering handles 83 and 84 to their normal forward biased positions. If the operator retains the handles in the braking position, the reenergization of the braking contactor B will complete an energizing circuit for the generator forward field winding through its interlock contact 49 and initiate reverse motoring operation.

Referring now to Fig. 4, the purpose of a blocking rectifier 160, not previously mentioned, will become evident. The rectifier 160 is located between the points 80 and 81 of the potentiometer bridges 74 and 75 and ground and has for its purpose the prevention of a reverse current in the main line circuit. Let it be assumed, for example, that the steering handles 83 and 84 are moved to braking position with the "dead man" handle interlocks 53 and 54 open. Under these conditions, the forward field 141 of the generator exciter 13 would be disabled so that there would be nothing to determine the direction of current flow in the generator output circuit. A reverse line current can start in the system and, under such circumstances, the reverse power relay would pick up under the influence of the winding 137 alone and cause closure of the braking contactor B. Under such conditions, the traction motor 16 and 17 would build up as series generators as desired, but without the braking resistor 21 in the main line circuit so that all the power would be absorbed in the generator 12 thereby causing the generator to overspeed the engine 10. The blocking rectifier 160 serves to prevent the motors from receiving any excitation due to a reverse line current so that braking under such conditions is not possible. Thus, at Fig. 4, it will be evident that if the potential of the grounded wire exceeds the potential at the point 81, as due to a reversal of line current, the potentiometers 74 and 75 will be short circuited through the blocking rectifier 160.

From the foregoing description, it will be evident that I have provided a generator excitation and engine governing system for a gas-electric power system which provides substantially immediate response of the relatively large amount of power in the main generator field circuit by governing control of very small amounts of control power, prevents overshooting of the control point by eliminating "hunting" in the generator exciter operation, and permits maximum utilization of available engine power over a very wide range of generator load currents. While this governing apparatus is especially suitable for application to gas-electric propulsion systems for self-propelled vehicles, it will be understood that it is not thus limited in its application.

Furthermore, while I have described only one preferred embodiment of my invention by way of illustration it will be evident that many modifications will occur to those skilled in the art and that I, therefore, intend by the appended claims to cover all such modifications as fall within the true spirit and scope of my invention.

What I claim as new and desire to secure by Letters Patent of the United States is:

1. A power system comprising a prime mover, a throttle valve for said prime mover, a direct current generator driven by said prime mover and arranged to supply power to an electrical load, means for controlling the field excitation of said generator, means responsive to rate of change of generator field excitation for opposing any such change, and a speed governor movable in response to the speed of said prime mover successively to control said throttle valve and said excitation controlling means thereby to maintain the power demand of said generator substantially equal to the maximum available power output of said prime mover throughout a wide range of generator load operation.

2. A power system comprising a prime mover, a throttle valve for said prime mover, a speed governor for controlling said throttle valve, a direct current generator connected to be driven by said prime mover and arranged to supply current to an electric motor, means for exciting said generator differentially in accordance with generator load current, means for changing the standard of excitation of said generator, means responsive to any change in generator excitation for opposing such change, and means controlled by said governor independently of said throttle valve for controlling said excitation changing means to maintain the power demand of said generator substantially equal to the maximum available power output of said prime mover over a wide range of generator load operation.

3. A power system comprising a prime mover, a direct current generator driven by said prime mover and arranged to supply current to an electric motor, the inherent power demand of said generator being greater than the maximum available power output of said prime mover over a substantial range of generator load operation but less than the maximum available power output of said prime mover above and below said range, means for controlling the power output of said prime mover, variable field excitation means for controlling the power demand of said generator, means responsive to rate of change of generator field excitation for opposing any such change, and means responsive to the speed of said prime mover for sequentially actuating said prime mover and generator power controlling means, said speed responsive means being arranged first to increase the power demand of said prime mover to its maximum value and thereafter to reduce the power demand of said generator to maintain the speed of said prime mover substantially constant.

4. A power system comprising an internal combustion engine, a throttle valve for said engine, a direct current generator driven by said engine and arranged to supply power to an electric motor, an exciter for supplying excitation current to said generator to render the inherent power demand of said generator greater than the maximum available power output of said engine over a substantial range of generator load operation but less than the maximum available power output of said engine above and below said range, means including a capacitor responsive to the rate of change of exciter voltage for opposing changes in generator field excitation, and a speed governor movable in response to the speed of said engine successively to control said throttle valve and said generator excitation thereby to maintain the power demand of said generator substantially equal to the maximum available power output of said engine throughout said range of operation.

5. A power system comprising a substantially constant speed internal combustion engine, a throttle for said engine movable between idling and full open positions, a direct current generator driven by said engine and arranged to supply power to an electric motor, an armature reaction excited direct current exciter for supplying field excitation current to said generator, a variable reference field exciting winding for said exciter, a differential field exciting winding for said exciter energized in accordance with main generator load current, a capacitor controlled field exciting winding for said exciter transiently energized in accordance with rate of change of exciter voltage to oppose any such change, a speed governor for controlling said throttle valve, said governor being provided with a predetermined amount of over-travel, and means responsive to over-travel of said governor occasioned by inability of said engine to maintain its governed speed with said throttle in said full open position for controlling the energization of said reference field exciting winding to decrease the power demand of said generator to equal the maximum available power output of said engine.

6. An electric power system comprising a prime mover, a throttle valve for said prime mover, a direct current generator driven by said prime mover and arranged to supply power to an electrical load, an armature reaction excited dynamoelectric exciting machine for supplying field excitation current to said generator, means responsive to the rate of change of output voltage of said dynamoelectric exciting machine for opposing any such change, and a speed governor movable in response to the speed of said prime mover successively to control said throttle valve and said output voltage of said dynamoelectric exciting machine thereby to maintain the power demand of said generator substantially equal to the maximum available power output of said prime mover throughout a wide range of generator load operation.

7. An electric power system comprising a prime mover, a throttle valve for said prime mover, a direct current generator driven by said prime mover and arranged to supply current to an electrical load, an armature reaction excited dynamoelectric exciting machine for supplying excitation current to said generator, means for controlling the excitation of said dynamoelectric exciting machine in accordance with the current supplied to said electrical load, means responsive to the rate of change of output voltage of said exciting machine for opposing any such change, and a speed governor movable in response to the speed of said prime mover successively to control said throttle valve and the standard of excitation of said exciting machine thereby to maintain the power demand of said generator substantially equal to the maximum available power output of said prime mover throughout a wide range of generator load operation.

MARTIN A. EDWARDS.

Certificate of Correction

Patent No. 2,393,619.

January 29, 1946.

MARTIN A. EDWARDS

It is hereby certified that errors appear in the printed specification of the above numbered patent requiring correction as follows: Page 6, second column, lines 59 and 60, strike out "The maximum vehicle speed is indicated at Fig. 6 by a line 101."; page 9, second column, line 27, for "oocurrence" read *occurrence*; page 10, second column, line 19, for "FPR" read *RPR*; line 24, strike out "for an actuating coil 135 of the braking" and insert instead *is provided with a polarizing winding*; line 30, for "winding 146" read *winding 136*; page 12, second column, line 11, for "motor" read *motors*; and that the said Letters Patent should be read with these corrections therein that the same may conform to the record of the case in the Patent Office.

Signed and sealed this 13th day of August, A. D. 1946.

[SEAL]

LESLIE FRAZER,
*First Assistant Commissioner of Patents.*